Jan. 20, 1970 W. M. BYERLEY 3,490,521
TUBE AND SHELL HEAT EXCHANGER
Filed March 12, 1968 2 Sheets-Sheet 2

United States Patent Office 3,490,521
Patented Jan. 20, 1970

3,490,521
TUBE AND SHELL HEAT EXCHANGER
Wilbur M. Byerley, Ridley Park, Pa., assignor to Westinghouse Electric Corporation, Pittsburgh, Pa., a corporation of Pennsylvania
Filed Mar. 12, 1968, Ser. No. 712,467
Int. Cl. F28d 7/10
U.S. Cl. 165—158                 6 Claims

ABSTRACT OF THE DISCLOSURE

This invention relates to a tube and shell heat exchanger for exchanging heat between two pressurized fluids and provides an improved channel head and tube sheet arrangement. The tube sheet is of annular shape with a circular outer periphery and a circular inner periphery and the channel head is of hemi-toroidal shape with a circular outer periphery integrally attached to the outer periphery of the tube sheet and a circular inner periphery integrally attached to the inner periphery of the tube sheet.

The central opening defined by the inner periphery of the tube sheet provides an access for a tubular conduit extending through the above channel head and tube sheet to the oppositely disposed tube sheet.

Background of the invention

Heat exchangers of the tube and shell type characteristically employ a bundle of tubes, either of the hairpin type in which both open-ends of each tube are connected to a tube sheet, or of the straight type in which the tubes are connected at their opposite ends to a pair of tube sheets. The tube sheet or sheets and their associated channel heads provide one or more chambers for admission to and removal from the tubes of one of the pressurized fluids. The other fluid is admitted to another chamber defined by the tube sheet/sheets and the outer shell.

For optimum heat exchange, it is desirable to employ as many tubes as the tube sheets can accommodate. Hence the tube sheets are provided with a great number of tube-accommodating holes spaced closely together. This results in a greatly weakened tube sheet that will tend to bow under the fluid pressures imposed. To overcome this, many schemes have been proposed, including making the tube sheet of great thickness. In fact, the term "tube sheet" is now considered to be a misnomer, since the thickness often ranges from 12 inches to 24 inches and more, for stiffness considerations.

Welded tube sheet and channel head structures of the hemi-spherical type have also been proposed for the above reasons.

In addition to the above, heat exchanger design has further been complicated because of thermal stresses induced in the various components during operation, since the two fluids are initially at considerably different temperatures.

Summary

In accordance with the teachings of this invention, the center portion of the tube sheet is devoid of tube accommodating holes and is preferably cut away, thereby imparting an annular shape to the tube sheet. The associated channel head is of generally hemi-toroidal shape, i.e., of annular shape with a semi-circular cross-section having inner and outer peripheral edge portions integrally connected to the inner and outer periphery of the tube sheet.

The resulting structure is highly rigid and is especially resistant to bowing or dishing of the tube sheet, since the tube sheet is supported in its central area as well as adjacent its outer periphery by the inherently rigid channel head.

In addition, the central portion of the tube sheet may be cut away, as explained above. This opening may be employd to provide entry of a tubular fluid conducting duct, which duct is preferably attached to the other tube sheet, when straight tubes are employed, to provide an internally disposed fluid communication therewith. The tubes are disposed in a chamber enclosed by inner and outer tubular shell structure and the inner shell structure is in concentric outwardly spaced relation with the tubular duct to minimize undesirable transfer of heat between the fluid in the tube chamber and the duct, with attendant minimization of thermal stress to the associated components.

Detailed description of the invention

Figure 1:
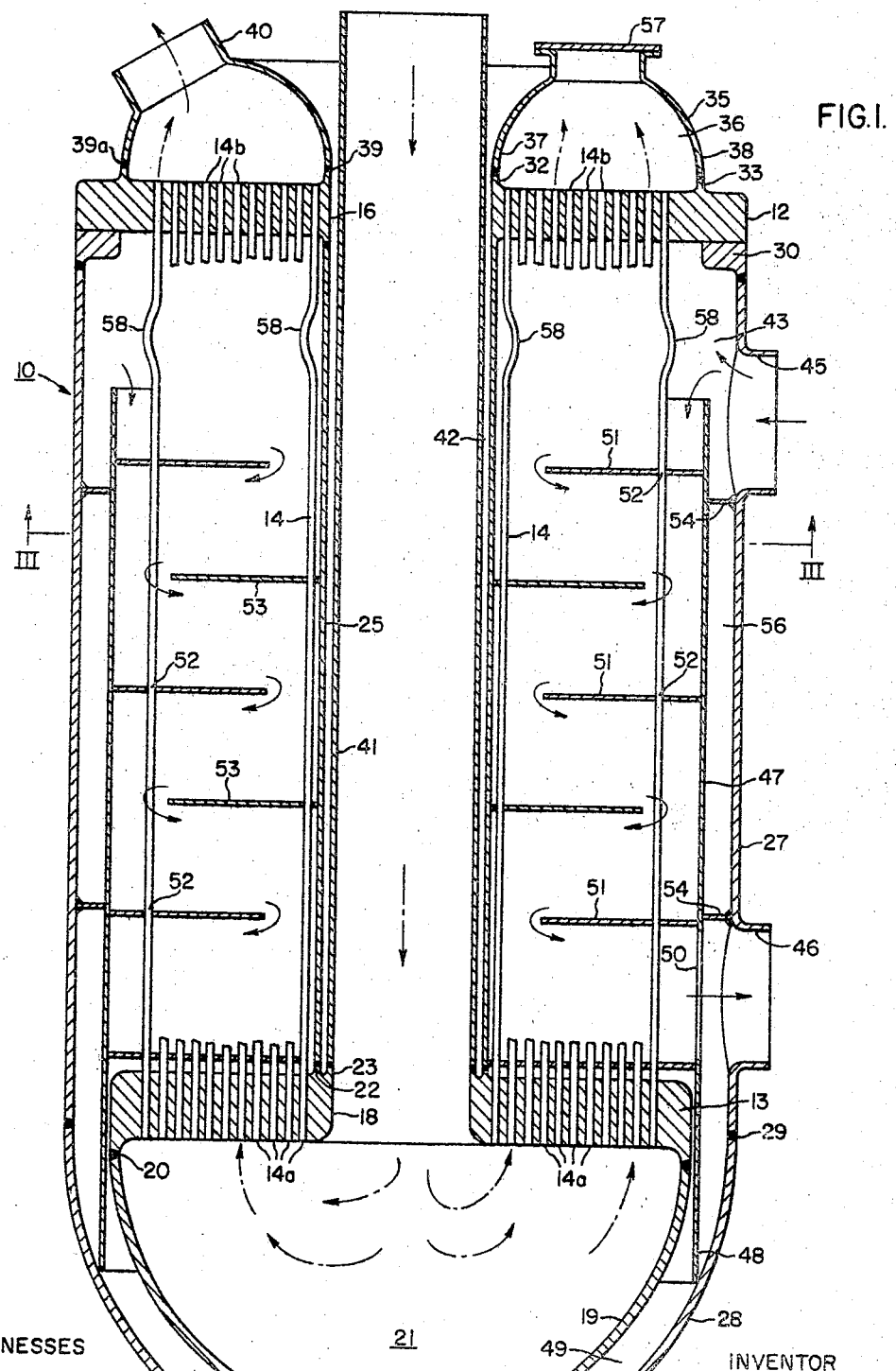
FIGURE 1 is a vertical longitudinal sectional view, taken on line I—I of FIG. 2, showing a tube and shell heat exchanger embodying the invention.

Referring to the drawings in detail, in FIG. 1 there is shown a heat exchanger 10, of the tube and shell type, comprising an upper tube sheet 12, a lower tube sheet 13 and a bundle of generally straight tubes 14 received at their upper and lower ends in leakproof relation with the associated tube sheets.

The tube sheets 12 and 13 are provided with central openings 16 and 18, respectively of circular shape, and their outer peripheries are of circular shape, hence the tube sheets are of annular shape. A hemispherical channel head 19 is integrally attached to the outer periphery of the lower tube sheet 13 by a continuous circumferential weld joint 20 and jointly with the tube sheet 13 defines a pressure tight fluid chamber 21 communicating with the open ends 14a of the tube 14 and the central opening 18.

The tube sheet opening 16 is of somewhat larger diameter than the tube sheet opening 18, and the lower tube sheet 13 is provided with a pair of concentric annular upstanding ribs 22 and 23. The outer rib 22 is of substantially the same diameter as the opening 16 and a tubular inner casing 25 of cylindrical shape is disposed between the tube sheets 12 and 13 and integrally connected at its upper end to the inner periphery of the tube sheet 12 and at its lower end to the outer rib 22.

The outer casing structure includes a tubular casing member 27 of cylindrical shape and a lower end closure member 28 of hemispherical shape joined to each other by a peripheral weld joint 29 at their abutting edges. The casing 27 is provided with an annular internal flange 30 which may be attached to the tube sheet 12 in any suitable manner, for example by bolts (not shown) to permit ready removal of the internal tube and tube sheet structure, when required, for servicing.

The upper tube sheet 12 is provided with inner and outer concentric upstanding ribs 32 and 33, and a channel head structure 35 is provided to jointly with the tube sheet 12 define a second fluid chamber 36.

The channel head 35 is of hemi-toroidal shape with concentric inner and outer circular marginal portions 37 and 38 integrally connected by peripheral weld joints 39, 39a to the inner and outer ribs 32 and 33, respectively, of the tube sheet, and of substantially semicircular cross-section. In other words, the channel head may be referred to as a hollow toroidal section taken in a plane normal to the central axis of the torus and may be of greater or lesser extent than hemi-toroidal, depending on whether the section is taken in a plane above or below the transverse axis of the torus.

Accordingly, the chamber 36 is of annular shape, and, in the illustration, is of slightly, though not necessarily, greater extent than hemi-toroidal, because of the height of the ribs 32 and 33.

Figure 2:
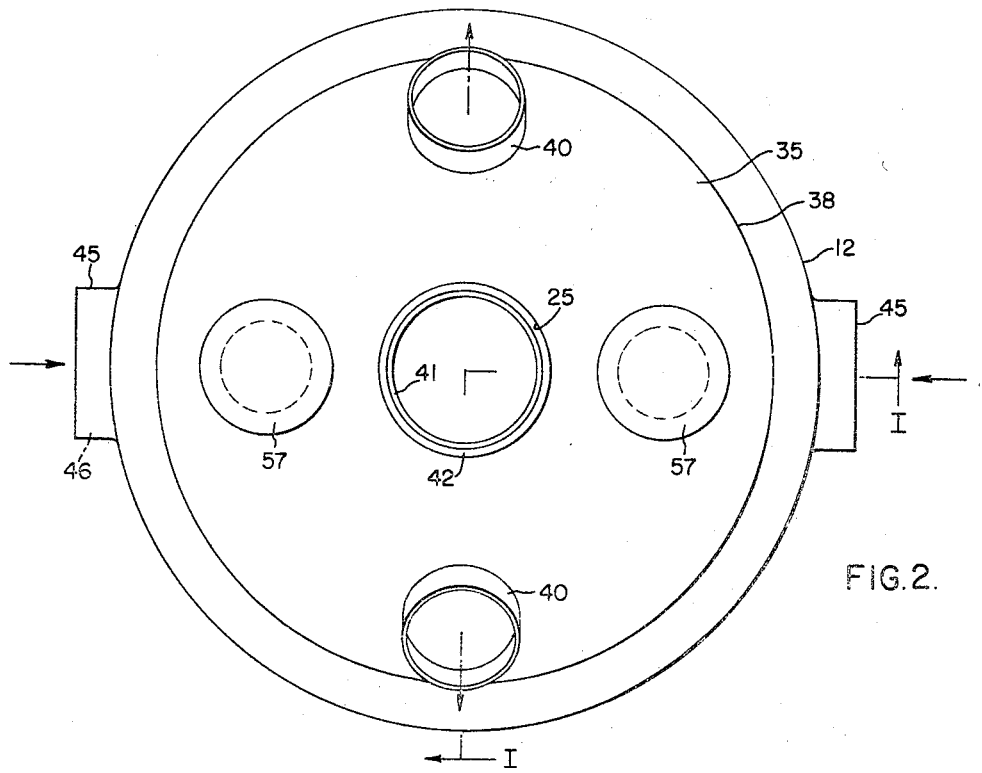
FIG. 2 is a plan of the heat exchange shown in FIG. 1.

The channel head 35, as also shown in FIG. 2, is provided with a pair of diametrically opposed openings or nozzles 40 communicating with the chamber 36 and the chamber 36, in turn, is in communication with the upper open-end portions 14b of the tubes 14.

A vertically elongated, rectilinear duct 41 of tubular shape extends through the opening 16 in the upper tube sheet 12 and is integrally connected at its lower end to the inner rib 23 of the lower tube sheet 13, as by welding. The duct 41 is preferably of cylindrical shape and of substantially the same diameter as the rib 23 and thus is of somewhat smaller diameter than the inner casing 25 and jointly therewith forms an annular air space 42, closed at the bottom end but open to the atmosphere at its upper end.

The upper tube sheet 12, inner and outer casings 25, 27 and the lower end closure 28 jointly define a third pressure tight fluid chamber 43, and, the outer casing is provided with a pair of upper and a pair of lower openings or nozzles 45 and 46, respectively, communicating with the chamber 43.

Within the chamber 43 there is provided a tubular inner shell or liner 47 encompassing the bundle of tubes 14 and extending from a region adjacent the upper nozzle 45 to a region below the lower tube sheet 13. The lower end portion 48 of the liner circumferentially abuts the lower end closure 28 and jointly therewith and with the lower channel head 19 defines a substantially hemispherical restricted space 49.

The inner shell 47 is provided with suitable openings 50 effecting fluid communication between the chamber 43 and the outlet nozzles 46, and also is provided with a plurality of vertically spaced, inwardly extending annular baffle plates 51 having openings 52 through which the tubes 14 extend. In a similar manner, the inner casing 25 is provided with a plurality of vertically spaced outwardly extending annular baffle plates 53 through which the tubes 14 extend. The baffles 51 and 53 alternate with each other to provide a tortuous path for fluid flow past the tubes, thereby to enhance heat transfer, as well known in the art.

The outer casing 27 is further provided with at least a pair of vertically spaced partition plates 54 of annular shape integrally connected thereto and extending radially inwardly into slidable abutment with the outer surface of the inner shell 47. Accordingly, the partition plates 54, outer casing 27 and inner shell 47 jointly define a restricted fluid space 56 of annular shape encompassing the inner shell 47.

Suitable covered manways 57 may be provided to permit access to the chamber 36 for servicing purposes.

In operation, a first pressurized fluid from any suitable source (not shown) for example a heating fluid, is directed through the inlet nozzles 45 into the upper portion of the chamber 43 and flows in a pattern, as indicated by the solid line arrows, around and across the tubes 14 and is eventually directed from the lower portion of the chamber 43 through the outlet nozzles 46.

Concomitantly therewith, a second pressurized fluid from any suitable source (not shown) for example, a fluid to be heated, is directed downwardly through the central duct 41 into the chamber 21, thence, in a pattern indicated by the dot-dash arrows, into the open ends 14a of the tubes 14, upwardly through the tubes 14 into the upper chamber 36 and finally directed from the chamber 36 through the outlet nozzles 40.

During the above, the heating fluid transfers some of its heat to the fluid to be heated, since the heating fluid is at a higher temperature, and is withdrawn in a cooler condition. Conversely, the fluid to be heated receives some heat from the heating fluid and is withdrawn in a hotter condition.

The fluids may be gaseous or liquid or mixtures of both, as well known in the art. However, the invention is particularly suited for liquid-to-liquid heat exchange at relatively high temperatures. For example, the heating liquid may be admitted to the chamber 43 at an initial temperature of about 1100° F. and a pressure of about 30 p.s.i.a. and withdrawn at a temperature of about 850° F., while the liquid to be heated may be admitted to the chamber 21 at an initial temperature of about 700° F. and a pressure of about 25 p.s.i.a. and withdrawn at a temperature of about 1065° F.

Figure 3:
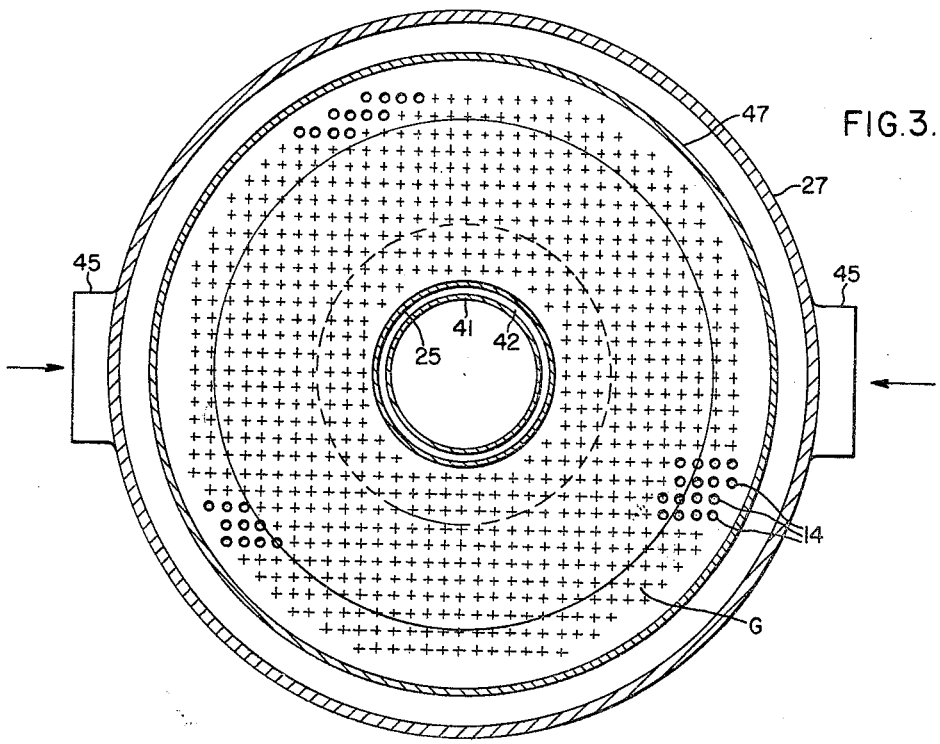
FIG. 3 is a transverse sectional view taken on line III—III of FIG. 1 and looking upwardly, as indicated by the arrows.

As previously stated, the number and size of tubes is an important heat exchange function consideration and it is desirable to employ as many tubes as the tube sheets can safely accommodate. Referring to FIG. 3, there is shown a grid of intersecting lines G indicating the general arrangement of the tube bundle and the required number and spacing of the holes in the tube sheet 12 to accommodate the tubes. This grid is only representative, since the tube diameter is a factor in the number of tubes that can be accommodated. In a typical example, the O.D. of the tubes is about ½″ and the center-to-center spacing is about ¾″, leaving a small web between holes of only ¼″. Nevertheless, it will now be apparent that the rigidity of the tube sheets 12 (and 13, as well) is greatly reduced because of the great number of closely spaced holes required.

The rigidity factor of the tube sheets, i.e., its resistance to the deflection forces of the fluid pressure, may be maintained within prescribed deflection or bowing limits by increasing the thickness of the tube sheet to compensate for the weakness imparted by the holes. Since the tube sheet 13 is supported by its associated channel head 19 in a generally conventional manner about its outer periphery, this tube sheet is of thicker cross-section than the upper tube sheet 12.

The upper tube sheet 12 and its associated hemitoroidal channel head jointly form a structure of highly increased rigidity and resistance to the deflecting forces of the pressurized fluid. This stiffening is attained by the additional support, adjacent the inner periphery of the tube sheet about the central opening 16, provided by the inner marginal portion 37 of the channel head 35. Hence, as indicated, the tube sheet 12 is of thinner cross-sectional thickness than the tube sheet 13 and yet equal to or of greater rigidity than the tube sheet 13.

The inner casing 25 is in direct contact with the heating fluid in chamber 43, while the duct 41 is in direct contact with the incoming fluid to be heated. Hence a great temperature differential exists between these two members that potentially could severely thermally overstress the two members. The annular air gap 42 between these two members being in open communication with the atmosphere, serves to insulate them from each other in a simple, yet effective manner. Of course, the insulation effect of the gap or space 42 could, if desired, be enhanced by provision of any suitable insulation material or packing.

In addition to the above, at the initiation of operation, the restricted spaces 56 and 49 become filled with a portion of the heating fluid, and this portion of the fluid becomes stagnant, i.e., does not circulate freely during operation. The stagnant fluid is effective to act as a thermal barrier minimizing loss of heat to the atmosphere as well as minimizing the thermal gradients that would otherwise exist between the inner and outer surfaces of the outer casing 27 and the inner and outer surfaces of the end closure 28.

If desired, the tube 14 may be provided with localized curved portions 58 of preferably sine wave shape to minimize stress on the tube sheets 12 and 13 and to minimize warping of the tubes that could be caused by thermal elongation in operation, as well known in the art.

The heat exchanger structure described in the above is inherently effective to minimize losses in the two fluids, due to pressure drop as they course through the structure, because of the novel arrangement of the component. This is an important consideration in heat exchangers especially where the fluids are in liquid form.

It will now be seen that the invention provides a compact heat exchanger in which a hemi-toroidally shaped channel head is integrally joined to a tube sheet in a manner to greatly increase the rigidity of the tube sheet, thereby permitting a reduction in thickness of the tube sheet or alternately permitting greater fluid pressures to be employed with no increase in tube sheet thickness.

It will further be seen that the invention provides a highly improved heat exchanger that is effective to transfer heat between two pressurized fluids, and especially liquids with a minimum of thermal stresses on the associated components.

While the invention has been shown in one form, it will be obvious to those skilled in the art that it is not so limited, but is susceptible of various other changes and modifications without departing from the spirit thereof.

What is claimed is:

1. A heat exchanger comprising
 a tubular casing structure open at least at one end,
 a tube means including sheet of annular shape having a central opening and extending across said open end, said tube sheet jointly with said casing defining a first chamber,
 a plurality of tubes disposed in said chamber and attached to said tube sheet at one end,
 a channel head of substantially hemi-toroidal shape having outer and inner peripheral edge portions of circular shape,
 said edge portions being integrally joined to said tube sheet and jointly therewith forming a second chamber of annular shape in fluid communication with said tubes,
 inlet means for admitting a first pressurized fluid at a first temperature to said first chamber in heat exchange relation with the outer surfaces of said tubes,
 outlet means for removing said first fluid from said first chamber,
 means including a conduit for directing a second pressurized fluid at a second temperature to said tubes, whereby during operation one of said fluids is heated by the other of said fluids with attendant cooling of the other of said fluids,
 means disposed in said toroidal head and communicating with said second chamber for directing said second fluid from said tubes,
 a second tube sheet of annular shape and having a central opening disposed adjacent the opposite end of said casing,
 a second channel head associated with said second tube sheet and jointly therewith forming a third chamber, said first tube sheet being of a lesser thickness than said second tube sheet,
 said tubes having their opposite end portions received in said second tube sheet and disposed in fluid communication with said third chamber, and
 said conduit extending through said hemi-toroidal head and the central opening in the first tube sheet to the central opening in said second tube sheet and disposed in fluid communication with said chamber.

2. The structure recited in claim 1, wherein
 the tubular casing includes concentric inner and outer casings,
 said inner casing being connected at one end to the first tube sheet and at its opposite end to the second tube sheet and partly defining the first chamber, and
 the conduit is disposed in inwardly spaced concentric relation with said inner casing and integrally connected to the second tube sheet.

3. The structure recited in claim 1, wherein
 the tube sheet is provided with concentric inner and outer flanges of circular shape, and
 the iner and outer edges of the hemi-toroidal channel head are integrally attached to said respective inner and outer flanges.

4. The structure recited in claim 1, and further including
 means including a tubular liner disposed within the casing structure in encompassing relation with the tubes,
 said tubular liner and the casing structure at least partially defining an annular restricted space for accumulation and stagnation of a portion of the first fluid.

5. The structure recited in claim 4, in which
 the last mentioned means includes annular partition structure further defining the restricted space.

6. A heat exchange comprising
 a tubular casing structure open at least at one end,
 a tube sheet of circular shape extending across said open end and jointly with said casing partly defining a first chamber,
 a plurality of tubes disposed in said chamber and attached to said tube sheet at one end,
 a channel head of substantially hemi-toroidal shape having outer and inner peripheral edge portions of circular shape,
 said edge portions being integrally joined to said tube sheet and jointly therewith forming a second chamber of annular shape in fluid communication with said tubes,
 said tube sheet having a central circular opening imparting an annular shape to the tube sheet, and the inner peripheral edge portion of the toroidal head being integrally connected to the tube sheet concentrically with said central circular opening,
 inlet means for admitting a first pressurized fluid at a first temperature to said first chamber in heat exchange relation with the outer surfaces of said tubes,
 outlet means for removing said first fluid from said first chamber,
 means for directing a second pressurized fluid at a second temperature to said tubes, whereby during operation one of said fluids is heated by the other of said fluids with attendant cooling of the other of said fluids,
 means for directing said second fluid from said tubes,
 at least one of said directing means being disposed in said toroidal head and communicating with said second chamber,
 a second tube sheet disposed adjacent the opposite end of said casing,
 a second channel head associated with said second tube sheet and jointly therewith forming a third chamber,
 said tubes having their opposite end portions received in said second tube sheet and disposed in fluid communication with said third chamber,
 a conduit extending through the central opening in the first tube sheet and disposed in fluid communication with said third chamber,
 said tubular casing including concentric inner and outer casings,
 said inner casings being connected at one end to said first tube sheet and at its opposite end to said second tube sheet and partly defining said first chamber, said conduit being disposed in inwardly spaced concentric relation with said inner casing and integrally connected to the second tube sheet, and said conduit and said inner casing jointly defining an annular space.

References Cited

UNITED STATES PATENTS

| | | | |
|---|---|---|---|
| 3,129,697 | 4/1964 | Trepaud | 122—34 |
| 3,187,807 | 6/1965 | Ammon | 165—158 X |
| 3,398,789 | 8/1968 | Wolowodiuk et al. | 165—158 X |
| 3,407,873 | 10/1968 | Ryall | 165—158 X |

FOREIGN PATENTS

| | | |
|---|---|---|
| 1,015,021 | 9/1957 | Germany. |
| 413,602 | 7/1934 | Great Britain. |
| 845,699 | 8/1960 | Great Britain. |

ROBERT A. O'LEARY, Primary Examiner

A. W. DAVIS, Assistant Examiner

U.S. Cl. X.R.

165—81, 161